United States Patent [19]

Mill et al.

[11] 4,108,746

[45] Aug. 22, 1978

[54] METHOD OF OXIDATIVE DEGRADATION OF PHOSPHOROUS ESTERS

[75] Inventors: Theodore Mill, Palo Alto; Constance W. Gould, Menlo Park, both of Calif.; Joseph Epstein; Leon J. Schiff, both of Baltimore, Md.

[73] Assignee: The United States of America as represented by the Secretary of the Army, Washington, D.C.

[21] Appl. No.: 831,564

[22] Filed: Sep. 8, 1977

[51] Int. Cl.$^2$ .............................................. B01J 1/10
[52] U.S. Cl. ................................................ 204/158 R
[58] Field of Search .................................. 204/158 R

[56] References Cited

U.S. PATENT DOCUMENTS

Re. 29,098   1/1977   Heichenbleikner et al. .... 204/158 R

OTHER PUBLICATIONS

Armstrong et al., Nature, vol. 211, (Jul. 30, 1966), pp. 481–483.
Research Disclosure, #119, (Mar. 1974).

*Primary Examiner*—Howard S. Williams
*Attorney, Agent, or Firm*—Nathan Edelberg; Kenneth P. Van Wyck

[57] ABSTRACT

A method for oxidatively degrading organophosphorous esters to phosphoric acid, carbon dioxide and water through the use of a source of free hydroxy radicals, saturation of the resulting solution with oxygen and subsequent irradiation with UV radiation between 220 and 280 nm.

14 Claims, No Drawings

METHOD OF OXIDATIVE DEGRADATION OF PHOSPHOROUS ESTERS

DEDICATORY CLAUSE

The invention described may be manufactured, used or licensed by or for the Government for governmental purposes without the payment to us of any royalty thereon.

DESCRIPTION OF THE INVENTION

The invention relates to a novel method of oxidatively degrading organophosphorous esters to phosphoric acid through the use of hydroxy free radicals, oxygen and UV radiation.

The invention further relates to a method of oxidatively degrading organic compounds which are reactive with hydroxy radicals and oxygen to give carbon dioxide and water.

The invention still further relates to a method for safe disposal of toxic chemicals to avoid regeneration of toxic materials while producing environmentally acceptable end products.

There exists a considerable need for efficient and rapid destruction of large amounts of toxic agents in the military as a means of eliminating surplus stock piles of these materials. The process used for destruction of these bulk agents must be environmentally sound and the end products must be easily and safely disposable. The present process of disposal of the toxic nerve agent, isopropyl methyl phosphonofluoridate (GB) is by hydrolysis, which yields a product mixture of sodium fluoride and sodium isopropyl methyl phosphonate (IMP). This mixture can, under low pH conditions, be partly reconverted to the toxic agent GB.

The present invention solves the problem of disposal of toxic chemicals without the likelihood of regenerating toxic materials, while producing environmentally acceptable end products. In particular, the present invention provides oxidative cleavage of sodium isopropyl methyl phosphonate with a hydroxyl radical and oxygen to produce a phosphoric acid, which is harmless, useful and incapable of reconversion into isopropyl methyl phosphonofluoridate (GB).

The present invention further provides a means for rapidly removing toxic agents from surfaces, utilizing atmospheric oxygen as the reactive species in a free-radical, light-sensitized oxidative degradation reaction. Unlike prior chemical or physical techniques requiring sprays, detergents, or surface coatings which are consumed in the reaction, the present oxidation reaction involves minimum consumption of other reactants.

Prior art proposed methods of achieving complete oxidation of phosphonate salts to phosphate salts and carbon dioxide have involved either heating aqueous solutions of the phosphate salts with oxygen at temperatures in the range of 200° C to 300° C or through the use of strong oxidants such as chromate, permanganate or nitric acid. These proposed methods have not been demonstrated to be effective in practice and in addition, suffer from the inherent disadvantages of requiring either high temperatures or the addition of chemicals, which add further disposal problems.

Other prior art methods which deal generally with oxidation of organic phosphorous compounds include a proposed method of oxidation of methyl phosphonic acid with ozone wherein an optimum rate of oxidation is achieved through the use of $10^{-2}$M cobalt nitrate with 3 mg/l. of ozone in air to give a 40% yield of phosphoric acid within 9 hours. Oxidative degradation by UV radiation of trimethyl phosphate with oxygen in an aqueous system has been reported to yield orthophosphoric acid, carbon monoxide and carbon dioxide by stepwise oxidation of the methyl groups to dimethyl hydrogen and methyldihydrogen phosphoric acids. Hydroxy free radical initiated oxidation has also been used in aqueous systems with concentrations of organic substrate as low as 0.001M eg oxidation of 0.03 - 0.005M acetic acid at 25° C. The facile cleavage of $H_2O_2$ with UV light is well known and is a convenient way of generating HO without the use of metal catalysts, such as $Fe^{2+}$ (Fenton's reagent).

The prior art oxidation processes, as described above, do not suggest that refractory organic compounds like the methyl phosphonate salts in the present invention, can be rapidly and efficiently oxidized to carbon oxides and phosphate salts using proper mixtures of hydrogen peroxide and oxygen activated by UV light at wave lengths below 300NM.

It is the primary object of this invention to provide a method for oxidatively degrading organic compounds which are reactive with hydroxy radicals and oxygen, i.e., hydrogen donors to give carbon dioxide and water.

It is another object of this invention to provide a method for oxidatively degrading organophosphorous esters to phosphoric acid utilizing hydroxy free radicals, oxygen and UV radiation.

It is a further object of this invention to provide a safe method of disposal of toxic chemicals so as to produce environmentally acceptable end products while avoiding regeneration of toxic materials.

A still further object of this invention is to provide a method wherein the hydrolysis products of the nerve agent isopropyl methyl phosphonofluoridate (GB) particularly sodium isopropyl methylphosphonate (IMP) are photo-oxidatively cleaved with hydroxyl radical, oxygen and UV radiation to produce phosphoric acid carbon dioxide and water.

These and other objects of this invention will become apparent from the following detailed description of the invention.

SUMMARY OF THE INVENTION

A method for oxidatively degrading an organic phosphorous compound to phosphoric acid, carbon dioxide and water comprising the steps of preparing an aqueous mixture of the organic phosphorous compound, admixing a source of hydroxy radicals to the aqueous mixture in an amount sufficient to provide a molar excess of hydroxy radical, saturating the resulting solution with oxygen and irradiating the oxygen saturated mixture with UV radiation from a UV source which transmits radiation at a wave length of less than 300 NM.

The overall reaction mechanism for the oxidations of sodium methyl phosphonate (MPA) or sodium isopropyl methyl phosphonate (IMP) by either oxygen or peroxide proceed from the stoichiometric equations

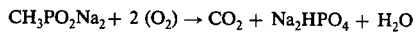

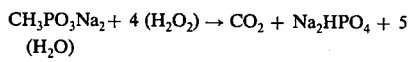

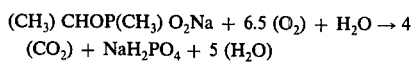

$(CH_3)_2CHOP(CH_3)O_2Na + 13(H_2O_2) \rightarrow 4(CO_2) + NaH_2PO_4 + 17(H_2O)$ wherein either oxygen or peroxide alone converts IMP or MPA to carbon dioxide, water and phosphoric acid. The oxidation of MPA or IMP requires a minimum of 4 to 13 peroxides for each molecule oxidized versus 2 or 7 oxygen molecules required to effect the same oxidation. To the extent that peroxide decomposes to oxygen by reaction with HO it is wasted.

Initial scouting experiments over a range of concentrations of MPA and peroxide resulted in the findings that at high ratios of peroxide to MPA, i.e., 10:1 all acid is converted to carbon dioxide and inorganic phosphorous within two hours, with all peroxide being consumed. Where the initial ratio of peroxide to MPA is lower, conversely, there is a lower rate or conversion of MPA and consumption of peroxide.

The oxidation of sodium isopropyl methyl phosphonate (IMP) under this invention results in complete oxidation of the IMP to acetic acid, acetone, $CO_2$, and MPA in 2 hr with 3M $H_2O_2$ through the following reaction steps:

(1) $(CH_3)_2CHOP(CH_3)O_2Na + H_2O \rightarrow$
    $\phantom{(1) }$ IMP
    $(CH_3)_2COP(CH_3)O_2Na + H_2$
    $\phantom{(1) (CH_3)_2COP(CH_3)O_2Na + H_2}$R.

(2) $HO\cdot + H_2O \rightarrow HO_2\cdot + H_2O$ (3) $R\cdot + O_2 \rightarrow RO_2\cdot$ (4) $RO_2\cdot + HO_2\cdot \rightarrow RO\cdot + O_2 + H_2O$ (5) $RO\cdot + IMP \rightarrow ROH + R\cdot$ (6) $ROH \rightleftharpoons (CH_3)_2CO + MPA$ Several steps $(CH_3)_2CO \xrightarrow{O_2} CH_3COOH + CO_2$ Several steps $CH_3COOH \xrightarrow{O_2} CO_2$ Through a series of three experiments with mixtures of sodium isopropyl methyl phosphonate (IMP) and $H_2O_2$ which were irradiated for 2 hr; analyzed for peroxide IMP, MPA, and intermediate organic products; mixed with additional $H_2O_2$ to restore the initial concentration of $H_2O_2$ and then irradiated again for 2 hours. The results of the three successive experiments for photo-oxidation of sodium isopropyl methyl phosphonate (IMP) with $H_2O_2$ are shown in the following table:

TABLE 1.

PHOTO-OXIDATION OF IMP WITH $H_2O_2$ (Initial pH=9; Solutions irradiated for 2 hr with a 450-W Hanovia Hg arc lamp)

| Initial Conditions | Experiment 1 | Experiment 2 (Mixture from 1 + $H_2O_2$) | Experiment 3 (Mixture from 2 + $H_2O_2$) |
|---|---|---|---|
| Liquid vol., ml | 3.80 | 2.09 | 0.64 |
| $O_2$, mmoles | 2.108 | 0.662 | 0.507 |
| [IMP] | 1.00 | trace | 0 |
| [MPA] | 0 | 0.66 | 0.32 |
| [$H_2O_2$] | 3.02 | 3.0 | 3.0 |
| [Acetone] | 0 | 0.14 | 0 |
| [Acetic acid] | 0 | 0.32 | 0.32 |
| Final | | | |
| $O_2$, mmoles | 0.635 | 1.926 | 0.916 |
| $\Delta O_2$, mmoles | −1.473 | +1.264 | +0.409 |
| [IMP] | trace | 0 | 0 |
| [MPA] | 0.94 | 0.46 | 0.07 |
| [$H_2O_2$] | 0 | 0 | 0 |
| [Acetone] | 0.2 | 0.01 | 0 |
| [Acetic acid] | 0.46 | 0.46 | 0.13 |
| $CO_2$, mmoles | 3.345 | 0.517 | 0.359 |
| CO, mmoles | 0.4 | 0.12 | 0 |

[a]Initial pH = 9.
[b]Solutions irradiated for 2 hr with a 450-W Hanovia mercury arc lamp.

In experiment 1, above, 1.0M IMP was completely oxidized to acetic acid, acetone, carbon dioxide and MPA within 2 hours with 3M $H_2O_2$. In experiment 2, the product from experiment 1 plus additional $H_2O_2$ demonstrated that 0.66 M MPA partially oxidizes to $CO_2$, 0.14M acetone oxidizes almost entirely to HOAc but that the 0.32M HOAc is largely resistant to oxidation. In experiment 3, where 0.32M MPA and 0.32 M HOAc is oxidized with 3M $H_2O_2$, most of the HOAc is oxidized along with the MPA. It is possible that the presence of acetate ion improves the efficiency per carbon oxidized of the overall process. An analysis by $^{31}P$ NMR showed only phosphoric acid as the final product, with 85–90% of the carbon accounted for in the material balances at each step. These results demonstrate clearly that the oxidation of IMP is much faster than the oxidation of MPA under these conditions.

The specific process of this invention involves the steps of preparing an aqueous mixture of an organic phosphorous compound to be oxidized e.g., sodium isopropyl methyl phosphonate (IMP) or methyl phosphonic acid and a 2 to 5 fold molar excess of hydrogen peroxide so that each component is present in a 0.2M to 1.0M concentration; saturating the resulting solution with oxygen and then placing the oxygen saturated solution in a tube made of UV radiation transmitting material, such as quartz or Vycor TM (a chemical and heat resistant glassware of 96% silica characterized by an extremely low coefficient of expansion and high UV transmission), and irradiating with a UV lamp transmitting radiation between 220 and 280 nm for 1 to 2 hours.

In the above process, the hydrogen peroxide could be replaced by alternate sources of hydroxy radicals such as ozone, nitrous acid, peroxydisulfate, all used with a UV light, or metal ions and peroxide used in the dark. The presence of any $Fe^{+2}$ impurity in the hydroylsis product of GB effectively prevents useful photo-oxidation with $H_2O_2$, unless Fe is removed or chelated. The $Fe^{+2}$, however, is an effective catalyst for peroxide conversion to HO radical in an acid media and oxidation of IMP in the dark has been found where $Fe^{+2}$ and peroxide are used.

The UV radiation used in this invention provides for photoinitiation of the oxidation reaction through the mechanism of cleavage, i.e., dissociation of $H_2O_2$ to hydroxyl radicals. Absorption of light by $H_2O_2$ is nearly complete a wave lengths below 260nm and is about 50% at wave lengths between 260nm and 300nm. Thus optimum results can be obtained with wave lengths below 260nm when using a typical UV radiation lamp such as a medium pressure 450W mercury lamp. A larger lamp could of course be used for obtaining an increased rate of photoinitiation.

The basic process of this invention can be shown by reference to the following examples for the photo-oxidation of sodium methyl phosphonate (MPA) and sodium isopropyl methyl phosphonate (IMP), which are meant to be merely illustrative and not in anyway limiting on the scope of this invention.

EXAMPLES 1: PHOTO-OXIDATION OF MPA AND IMP

Aqueous solutions of 0.2–2M sodium methyl phosphonate with 0.2–5M hydrogen peroxide and 0.2–2M sodium isopropyl methyl phosphonate with 0.2–5M hydrogen peroxide are placed in quartz reaction vessels flushed with oxygen, stoppered with vented caps, and irradiated with UV light below 300nm. The UV light source is a water-cooled Hanovia 450W mercury arc lamp mounted coaxially at a distance of 5–15cm from the reaction vessel. Irradiation was continued until the phosphorous esters were completely oxidized within 1–2 hrs. Analysis of the reaction mixtures by $^1H$ NMR and by $31_P$ NMR revealed that the only phosphorous-containing reaction product were phosphoric acid. Gas analysis revealed that $CO_2$ and to a much lesser extent CO, were also formed. In the case of sodium isopropyl methyl phosphonate, significant amounts of the intermediates acetic acid and acetone are found, but these intermediates will further oxidize with peroxide to produce $CO_2$.

EXAMPLES 2: PHOTO-OXIDATION OF MPA AND IMP

Approximately 4ml of a reaction mixture of MPA or IMP and $H_2O_2$, as in Example 1, were added to 26mm × 28cm quartz tubes. The tubes were flushed with oxygen for 3 min and stoppered with a serum cap which was slashed to vent any built-up pressure caused by formation of oxygen and $CO_2$. Three tubes were clamped to the shaft of a stirring motor mounted so that the shaft and tubes rotated almost horizontally. The center of the shaft was 13cm from the center of a Hanovia 450W mercury arc lamp, Model 79A10, mounted horizontally and water cooled by a quartz condenser. The tubes were protected from the lamp for a 5-min warm-up, after which the tubes were rotated at approximately 60 rpm for 1–2 hr.

After reaction, a $^{31}P$ NMR was used to determine the amount of remaining MPA (MPA being the oxidation reaction product of IMP) and the results indicated that there was no remaining reaction product other than phosphoric acid.

It can be seen from the above reaction examples that OH initiated oxidations of the salts of MPA and IMP is very effective under conditions where oxidation by other radicals would be very slow except at high temperatures.

The production of acetone and acetic acid as intermediates in the oxidation of IMP provides an opportunity to remove these organic constituents by distillation, as an alternative to further consumption of peroxide in continuing the oxidation of the intermediates to the final $CO_2$ product.

The process of this invention can be also applied to the oxidation of such organic compounds as organoarsenicals and organophosphorous compounds, with the resulting final products giving arsenic and phosphoric acids, respectively, in addition to carbon dioxide and water.

The method of this invention has particular utility when used for oxidatively degrading the organophosphorous salts resulting from the demilitarization i.e., hydrolysis of toxic organophosphorous esters like the nerve agent GB in that it prevents reconstitution of toxic esters while reducing the quantity of salt to be disposed by 25% and producing useful and environmentally acceptable products.

The particular reaction conditions and concentrations of the reactants used in this process are not critical in themselves and can be varied within the skill of one in the chemical arts to obtain optimum degrees of oxidation at the desired rate of reaction. The particular wave length of UV radiation used is also not critical within the limitations set forth above as to the decreasing effectiveness of UV radiation to degrade $H_2O_2$ to OH at wave lengths above 300nm.

Applicants having disclosed their invention, obvious modification will become apparent to those skilled in the related chemical arts and applicants therefore desire to be limited only by the scope of the appended claims.

We claim:

1. A method for oxidatively degrading an alkyl methylphosphono compound selected from the group consisting of O-alkyl methylphosphonic acid and its esters to give the oxidation products phosphoric acid, carbon dioxide and water comprising the steps of preparing an aqueous mixture of said alkyl methylphosphono compound, mixing the resulting aqueous mixture with a two to five molar excess of a source of free hydroxy radicals, saturating the resulting solution with UV radiation at a wave length below 300nm to thereby initiate oxidation of the alkyl methylphosphono compound and continuing said irradiation for one to two hours for complete oxidation.

2. The method of claim 1 wherein the O-alkyl methylphosphono compound and the source of free hydroxy radicals are each present in a 0.2M to 1.0M concentration.

3. The method of claim 2 wherein the source of free hydroxyl radicals is hydrogen peroxide and the UV radiation used is at a wave length in the range of between 220nm and 280nm.

4. The method of claim 1 wherein the organophosphorous ester is sodium isopropyl methyl phosphonate.

5. The method of claim 4 wherein the source of free hydroxyl radicals is hydrogen peroxide.

6. The method of claim 1 wherein the source of free hydroxyl radicals is selected from the group consisting of hydrogen peroxide, ozone, nitrous acid and peroxydisulfate.

7. The method of claim 6 wherein the source of free hydroxyl radicals is hydrogen peroxide.

8. The method of claim 1 wherein the UV radiation used is at a wave length in the range of between 220nm and 280nm.

9. An improved method for safe disposal of toxic organophosphorous agents without regeneration of toxic materials wherein the toxic organophosphorous agent is initially hydrolyzed, the improvement comprising oxidatively degrading the resulting products of the hydrolysis of the toxic organophosphorous agent, which include an alkyl methylphosphonate, through the steps comprising forming an aqueous mixture of said hydrolysis products with a two to five molar excess of a source of hydroxy free radicals, saturating the resulting aqueous mixture with oxygen, irradiating said oxygen saturated mixture with UV radiation at a wave length of below 300nm to initiate oxidation of the hydrolysis products and continuing the UV irradiation for 1 to 2 hours until the hydrolysis products are completely oxidized to phosphoric acid, carbon dioxide and water.

10. The method of claim 9 wherein the hydrolysis products and the source of hydroxyl free radicals are each present in a 0.2M to 1.0M concentration.

11. The method of claim 10 wherein the toxic organophosphorous agent is isopropyl methyl phosphonofluoridate (GB) and the hydrolysis product to be oxidized includes sodium isopropyl methylphosphonate (IMP).

12. The method of claim 11 wherein the source of hydroxyl free radicals is selected from the group consisting of hydrogen peroxide, ozone nitrous acid and peroxydisulfate.

13. The method of claim 12 wherein the source of hydroxyl free radicals is hydrogen peroxide.

14. The method of claim 13 wherein the UV radiation used is at a wave length in the range of between 220nm and 280nm.

* * * * *